United States Patent
Elbs et al.

(10) Patent No.: US 7,992,620 B2
(45) Date of Patent: Aug. 9, 2011

(54) SHADE ARRANGEMENT FOR A MOTOR VEHICLE

(75) Inventors: Norbert Elbs, Munich (DE); Manfred Hoeller, Munich (DE); Thomas Stemmer, Munich (DE); Horst-Martin Schulz, Weil (DE); Wolfgang Wagner, Munich (DE)

(73) Assignee: Webasto AG, Stockdorf (DE)

( * ) Notice: Subject to any disclaimer, the term of this patent is extended or adjusted under 35 U.S.C. 154(b) by 469 days.

(21) Appl. No.: 11/718,055

(22) PCT Filed: Oct. 25, 2005

(86) PCT No.: PCT/DE2005/001913
§ 371 (c)(1),
(2), (4) Date: Aug. 4, 2009

(87) PCT Pub. No.: WO2006/045288
PCT Pub. Date: May 4, 2006

(65) Prior Publication Data
US 2009/0301666 A1    Dec. 10, 2009

(30) Foreign Application Priority Data
Oct. 27, 2004  (DE) ................ 20 2004 016 624 U

(51) Int. Cl.
*E06B 9/08*    (2006.01)

(52) U.S. Cl. ............................... 160/120; 160/370.22
(58) Field of Classification Search .............. None
See application file for complete search history.

(56) References Cited

U.S. PATENT DOCUMENTS

| | | | | |
|---|---|---|---|---|
| 722,342 | A * | 3/1903 | Williams | 160/85 |
| 4,558,475 | A * | 12/1985 | O'Brien | 4/607 |
| 4,979,775 | A | 12/1990 | Klose | |
| 5,064,238 | A * | 11/1991 | Mohtasham | 296/97.6 |
| 5,135,279 | A | 8/1992 | Beatty | |
| 5,495,884 | A * | 3/1996 | Shikler | 160/120 |
| 6,161,607 | A * | 12/2000 | de Kimpe et al. | 160/238 |
| 6,460,593 | B1 * | 10/2002 | Floyd | 160/370.22 |
| 6,634,703 | B1 * | 10/2003 | De Gaillard | 296/214 |

FOREIGN PATENT DOCUMENTS

| | | |
|---|---|---|
| DE | 197 22 722 A1 | 12/1998 |
| DE | 197 50 713 C1 | 12/1998 |
| DE | 199 10 949 A1 | 9/2000 |
| EP | 1 153 777 A2 | 11/2001 |
| WO | 02/42103 A1 | 5/2002 |

\* cited by examiner

*Primary Examiner* — Blair M. Johnson
(74) *Attorney, Agent, or Firm* — Roberts Mlotkowski Safran & Cole, P.C.; David S. Safran

(57) ABSTRACT

This invention relates to a shade arrangement for a motor vehicle with at least two shades having lengths of shade material (10a, 10b), which are located next to one another and to one end of which a respective pull (14a, 14b) is attached. Both of the lengths of shade material (10a, 10b) are drawn out and taken up in the same direction at their opposite end from/onto a common roller tube (12) which is pretensioned in the take-up direction.

7 Claims, 2 Drawing Sheets

SHADE ARRANGEMENT FOR A MOTOR VEHICLE

BACKGROUND OF THE INVENTION

1. Field of Invention

This invention relates to a shade arrangement for a motor vehicle with at least two shades which are located next to one another, and to which a respective pull is attached.

2. Description of Related Art

Shade arrangements for use in motor vehicle construction are known from numerous documents. They are used, for example, as sun protection under a transparent vehicle body surface or as a covering for the cargo space in a station wagon. Often, these shade arrangements consist of a single length of shade material which is attached on one end to a roller tube and is tensioned against the reset force of the roller tube. The other end of the length of shade material is, conventionally, attached to a pull with which the length of shade can be drawn off the roller tube by an electric drive or by hand.

However, shade arrangements for motor vehicles are also known in which there are multiple shades. Thus, for example, German Patent Application DE 38 13 153 A1 and corresponding U.S. Pat. No. 4,979,775 and German Patent Application DE 199 10 949 A1 each disclose shade arrangements for windshields of motor vehicles having two shades in which two lengths of shade material are located at a distance from one another on two separate roller tubes. However, the use of two separate roller tubes for the lengths of shade material is disadvantageous in these embodiments since this increases material and installation cost.

German Patent DE 197 50 713 C1 discloses a shade arrangement for a motor vehicle in which two lengths of shade material which are drawn out in opposite directions can be taken up on a common roller tube again in opposite directions, and in the taken-up state, come to rest congruently on one another. German Patent Application DE 197 22 722 A1 discloses a shade arrangement in which a number of individual lengths of shade material are wound between two common roller shafts. In any case, here, in turn, there are separate roller tubes for each individual shade on one of the two common winding shafts.

SUMMARY OF THE INVENTION

The object of this invention is to devise a shade arrangement for a motor vehicle in which there are at least two lengths of shade material located next to one another, and in which the number of components and thus the production and installation costs are reduced. This object is achieved by a shade arrangement wherein the shades are taken up onto and withdrawn from the same roller tube in the same direction, and the roller tube is pretensioned in a take-up direction.

In achieving the object in accordance with the invention, the different lengths of shade material are taken up on one end onto an individual, common roller tube which is pretensioned in the take-up direction. Thus a shade arrangement for a motor vehicle can be devised in which there are at least two lengths of shade material which are located next to one another and in which the number of elements used for the entire shade arrangement is reduced compared to the known arrangements.

The invention is explained in detail below by way of example with reference to the accompanying drawings.

DETAILED DESCRIPTION OF THE INVENTION

Figure 1:
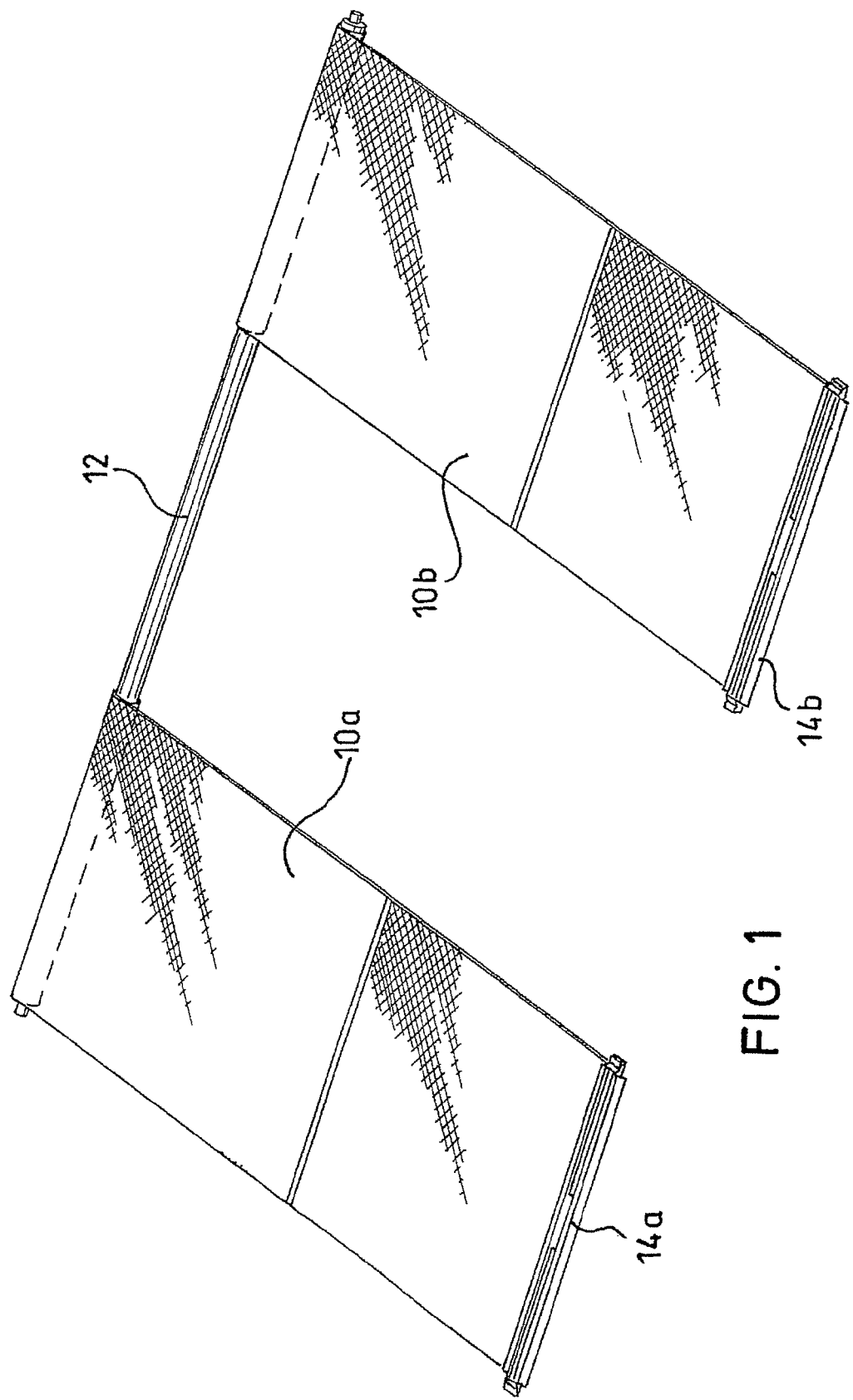
FIG. 1 is a schematic view of a shade arrangement for a vehicle with two lengths of shade located next to one another.

FIG. 1 shows a shade arrangement in accordance with the invention for a motor vehicle with two shades having lengths of shade material 10a, 10b which are located next to one another, and to which a respective pull 14a, 14b is each of the lengths of shade material. In accordance with the invention, at this point, the end of each of the two lengths of shade material 10a, 10b which faces away from the pull 14a, 14b can be taken up onto a single common roller tube 12 which is pretensioned in the take-up direction. The roller tube 12 is rotatably mounted, here, in the vehicle body (not shown) and the two pulls 14a, 14b are movably guided in body-mounted guides (not shown) for drawing the two lengths of shade material 10a, 10b off the roller tube 12. A shade arrangement as shown here is used preferably as sun protection in a motor vehicle roof, in which in the region of the two drawn lengths of shade 10a, 10b, roof glazing is inserted into the roof skin and the roof skin is made unglazed in the region between the two lengths of shade material and/or for example, has a center bracket. However, since the two lengths of shade material 10a, 10b are taken up onto a common roller tube 12, on the one hand, there is the advantage that the number of installed parts is reduced as compared to designs with separate roller tubes since, for example, fewer roller bearings are necessary. On the other hand, the complexity and effort for installation are also reduced. tool. In other preferred embodiments of the invention, the lengths of shade material 10a, 10b can be made from an elastic material so that in spite of possibly different drawing lengths of the individual shades, tension in the two lengths of shade material can be maintained and sagging of an individual shade can be avoided. These differences in the drawing lengths arise, for example, when cable offset occurs in a drive line with two drive cables for the two lengths of shade material 10a, 10b. Furthermore, due to a certain amount production tolerances in the length of the lengths of shade material 14a, 14b can also be equalized.

Figure 2:
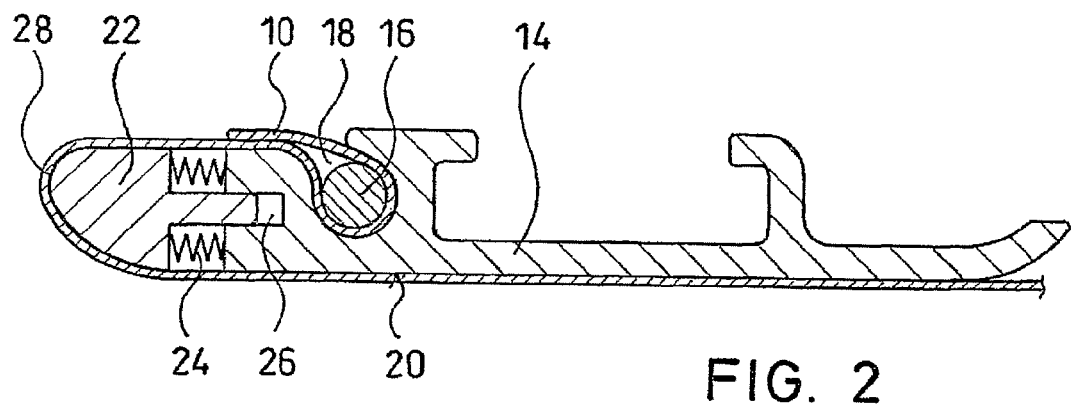
FIG. 2 is a schematic cross section through the pull of the shade arrangement in accordance with the invention.

FIG. 2 shows a cross section through the pull 14 of a shade arrangement in accordance with the invention for a motor vehicle. The pull 14 has an insertion gap 18 into which a shade material 10 is fastened on its end (facing away from the roller tube) by its being guided around a piped wire 16, the piped wired together with the turned-down shade length being inserted into the insertion gap. The shade material 10, proceeding from the pull 14 is guided around a deflection element 22 and continues to run in the direction of the roller tube after a deflection edge 28 which is molded on the deflection element. Along the pull 14, the material adjoins its contact surface 20. The deflection element 22 is connected to the pull 14 by being movably guided, on the one hand, in the guide channel 26 of the pull, and on the other hand, is pretensioned in a direction away from the pull and from the roller tube by means of spring elements 24. The spring tension of the spring elements 24 also tensions the length of shade material 10 away from the pull 14 and the roller tube via the deflection element 22. This ensures that, even for different extension lengths of the different pulls 14a, 14b of several lengths of shade material 14a, b, for the aforementioned reasons, these lengths of shade material remain tensioned. Differences in the lengths of the lengths of shade material 14a, 14b can likewise be equalized and sagging of individual lengths of shade material 14a, 14b is thus avoided overall.

In alternative embodiments of the invention, the deflection element is not pretensioned away from the pull by spring elements, as shown in FIG. 2, but the position of the deflection element relative to the pull can be adjusted via a positioning mechanism such that, in turn, sagging of individual lengths of shade material is avoided. Such a positioning mechanism can, for example, contain a screw mechanism.

Figure 3:
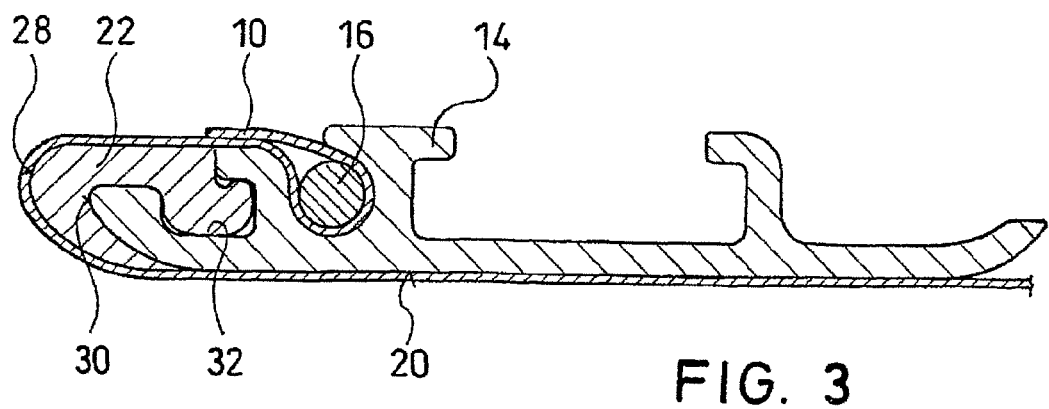
FIG. 3 is a schematic cross section of an alternative embodiment of the pull of a shade arrangement in accordance with the invention.

One embodiment of a pull 14 alternative to FIG. 2 with a deflection element 22 is schematically shown in FIG. 3 in a cross section. Similarly to FIG. 2, the shade material 10 is also fixed here by means of a piped wire 16 on the pull 14 and is guided further around the deflection element 22 around a deflection edge 28 which is molded on this deflection element in the direction of a roller tube which likewise is not further shown here. However, in contrast to FIG. 2, the deflection element 22 of FIG. 3 is not movably guided in the pull 14, but it is a separate deflection element which influences the tension of the assigned shade length 10 based on its periphery. The correspondingly dimensioned deflection element 22 is connected to the pull 14 by being inserted into a groove 32 of the pull between the pull and shade material 10. Different tensions of different lengths of shade material 10 of the shade arrangement in accordance with the invention can now be equalized by differently dimensioned deflection elements 22 being inserted into the different pulls 14. For example, for the different deflection elements 22, the distance between the deflection edge 28 and the end position of the piped wire 16 in the pull 14 can be different or alternatively or additionally the periphery of the deflection element. But a deflection edge 22 can also be completely omitted in order to reduce the tension of a certain length of shade 10, by which this shade material is then deflected around the edge 30 of the pull which is molded onto the pull 14 in the direction of the take-up shaft.

Preferably, at this point, the deflection element 22 and pull 14 and its groove 32 are made such that the deflection element can be inserted into the pull transversely to the drawing direction of the length of shade 10. Thus, for example, during installation, when the shade material 10 is already guided around the pull 14, another deflection element 22 can be inserted later or if necessary also replaced. A shade arrangement in accordance with the invention can also be made such that the difference in the tensions in the different lengths of shade material 10 can also be equalized later by replacing the deflection elements 22 in the maintenance of the length of shade.

What is claimed is:

1. Shade arrangement for a motor vehicle, comprising:
a roller tube,
at least two shades which are located next to one another, the shades being made of lengths of shade material to which a respective pull is attached, wherein the shades are taken up onto and withdrawn from said roller tube in the same direction, and wherein the roller tube is pretensioned in a take-up direction,
wherein at least one of the pulls is connected to a deflection element, each length of shade material runs from the respective pull, around the deflection element and then toward the roller tube, and wherein the position of the deflection element is adjustable relative to the pull in directions in which the shades are taken up and withdrawn to set the tension of the respective length of shade material.

2. Shade arrangement as claimed in claim 1, wherein the shade material is an elastic material.

3. Shade arrangement as claimed in claim 1, wherein the deflection element is pretensioned away from the pull.

4. Shade arrangement as claimed in claim 3, wherein the deflection element is pretensioned by means of a spring element.

5. Shade arrangement for a motor vehicle, comprising:
a roller tube,
at least two shades which are located next to one another, the shades being made of lengths of shade material to which a respective pull is attached, wherein the shades are taken up onto and withdrawn from said roller tube in the same direction, and wherein the roller tube is pretensioned in a take-up direction,
wherein at least one of the pulls is connected to a deflection element, each length of shade material runs from the respective pull, around the deflection element and then toward the roller tube, and
wherein the pull has at least one guide channel in which the deflection element is movably guided.

6. Shade arrangement for a motor vehicle, comprising:
a roller tube,
at least two shades which are located next to one another, the shades being made of lengths of shade material to which a respective pull is attached, wherein the shades are taken up onto and withdrawn from said roller tube in the same direction, and wherein the roller tube is pretensioned in a take-up direction,
wherein at least one of the pulls is connected to a deflection element by means of which the respective shade material, proceeding from the respective pull, is deflected in toward the roller tube, the deflection element being formed by a separate equalization profile that is dimensioned to set the tension of the respective shade material, and
wherein the deflection element is one of several differently dimensioned deflection elements, each of which is exchangeably and detachably connectable to the pull for setting the tension of the respective shade material.

7. Shade arrangement as claimed in claim 6, wherein the deflection element insertable into the pull in a direction that is transverse to the drawing directions in which the shades are taken up and withdrawn.

* * * * *